Patented Aug. 10, 1926.

1,595,358

UNITED STATES PATENT OFFICE.

CHARLES E. PARSONS, OF NEW YORK, N. Y., ASSIGNOR TO METAL RESEARCH CORPORATION, OF NEW YORK, N. Y., A CORPORATION OF DELAWARE.

PROCESS OF MAKING GLASS.

No Drawing.  Application filed September 19, 1925. Serial No. 57,463.

This invention relates to a process of making glass and has for its object to improve the procedures heretofore proposed.

With this and other objects in view, the invention consists in the novel steps and combinations of steps constituting the process, all as will be more fully hereinafter disclosed and particularly pointed out in the claims.

In order that the precise invention may be the more clearly understood, it is said: In the present method of manufacturing glass, lime, sand, and carbonate of sodium, or sulphate of sodium are mixed together and melted. This produces glass. It is necessary, however, to use the sodium in the form of carbonate or a sulphate, both of which are relatively expensive. The sand and the lime employed must also be of exceptional purity and substantially free from iron, otherwise the glass will be discolored. By this process, on the other hand, it is proposed to produce colorless glass by obtaining the silica and lime from the relatively inexpensive blast furnace slag and to also employ sodium chloride in the charge, which is the cheapest form of sodium compound, instead of the more expensive sulphate of soda.

In carrying out this process, one may proceed as follows: Any form of slag, containing alumina, may be used and one may mix with the same a suitable quantity of alkali metal chloride, such as sodium or potassium chloride, and coke, or charcoal, and effect a fusion of such alkali chloride and slag, in an ordinary blast furnace. The approximate reaction may be stated thus: R, denoting either sodium or potassium.

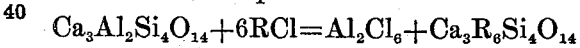

The temperature necessary for this reaction to proceed with a velocity suitable for an industrial application is not substantially below 1400° C., but at this temperature, alkali metal chloride exist only as vapors in an atmosphere of the usual coke or charcoal combustion products. On the other hand, in the presence of a high partial pressure of alkali metal chloride vapors, the boiling point of an alkali metal chloride is progressively raised until at a partial pressure of about 48 cm. the alkali metal chloride no longer vaporizes at 1400° C., but remains in contact with the slag in the form of a liquid for an ample time to effect reactions according to mass effect laws, and thus enables volatile aluminium chlorides to form and separate out.

It is obvious, therefore, that for the practical operation of this process, a commercially feasible means must be provided for maintaining a high partial pressure of the alkali metal chloride employed in the combustion or high temperature zone of the furnace, for otherwise the alkali metal chloride will boil off and therefore fail to react with the slag constituents present. In order that the means supplied in this process may be clearly understood, it is said:

It is well known that in an ordinary iron ore blast furnace, the total alkali metal in the furnace charge may be as much as one tenth of one per cent, and yet such a furnace may be in operation for several weeks without any alkali metal being found in the slag or exit gases. On the other hand, the atmosphere of the tuyère or combustion zone will contain from, say, 6 to 8% alkali metal cyanamid and cyanides, for when the furnace is blown in the alkali metal in the furnace burden near the hearth is confined in a gaseous atmosphere consisting almost solely of nitrogen and carbon monoxide. But as the alkali metal bearing mineral commences to fuse, it contacts with hot carbon in an atmosphere high in nitrogen, and the following reaction occurs:

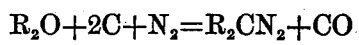

The alkali cyanamid being volatile at its temperature of formation, rises with the combustion gases until the cold down-coming burden lowers the temperature to 700° C. approximately, at which temperature, the carbon monoxide present dissociates in part, as follows:

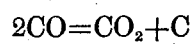

and the carbon dioxide $(CO)_2$ thus made being in contact with the alkali cyanamid reacts to form alkali carbonate, as follows:

The alkali carbonate thus formed in contact in a state of fusion with alkali cyanamid, reacts to form alkali cyanide, by the following well known equation:

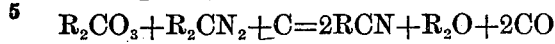
$$R_2CO_3 + R_2CN_2 + C = 2RCN + R_2O + 2CO$$

All these products, except the carbon monoxide, condense on the cold burden near the top of the furnace, and are thus returned to the high temperature zone. This cycle continues until the partial pressure of the vaporized alkali metal cyanamid in the high temperature zone becomes so high that the alkali metal cyanamid inevitably formed can no longer take its vapor form, and it goes out of the furnace with the slag.

In like manner, in making glass by this process, the concentration of alkali metal chloride vapor in the high temperature zone of the blast furnace is concentrated by the vapor condensing on the cold downcoming furnace burden, and thus continually returned to the high temperature zone where the cycle is repeated until finally such a high partial pressure of alkali metal chloride vapor is established in the high temperature zone that the said alkali metal chloride no longer vaporizes at the temperature of such zone, but remains as a liquid in contact with the molten slag, and consequently the components of such slag and liquid alkali metal chloride are free to establish an equilibrium and expel therefrom any volatile products capable of being formed. Any volatile aluminium chloride thus produced have a boiling point below that of the temperature of the throat of the blast furnace, and hence flows out with the combustion gases, and such aluminum chloride may be recovered in any suitable manner. Any iron present in the slag also leaves the furnace as anhydrous chloride and in consequence the aluminum chloride recovered is contaminated with iron and requires purification.

The concentration of the alkali metal chloride to cause it to assume the liquid form in the manner stated must correspond to that concentration which would correspond to a partial pressure of 48 cm.

The blast furnace slag produced by this operation consists of an iron-free calcium sodium silicate, or what is known as glass, in commerce.

It is obvious that in commencing the operation of a blast furnace on this process, the burden must at first carry sufficient alkali carbonate to make a fluid slag, in order to enable one to tap the furnace, and this must be continued until the concentration of alkali metal chloride in the high temperature zone becomes such as would be supplied by the required partial pressure of 48 cm. of alkali metal chloride vapor. When this is reached, the alkali carbonate which has been added in continuously decreasing proportions, may be wholly discontinued.

It will now be clear that one in carrying out this process will take ordinary blast furnace slag, add thereto sodium chloride, in accordance with the first equation above mentioned, heat the mixture until a partial pressure of the sodium chloride is sufficient to cause the reactions in said equation, whereupon the blast furnace slag containing a double silicate of calcium and sodium is produced as a finished product. The partial pressure of the sodium chloride should be at least 48 cm. if the total pressure is 76 cm., but this partial pressure may go higher without doing any harm. It is best to have a closed furnace so that the partial pressure of the sodium chloride may be regulated. In practice, however, the furnace may be open to the atmosphere, and owing to the low temperature of the gases at the exit end and to the relatively high rate at which the sodium chloride vapor is formed, at the bottom, the concentration of the vapors of sodium chloride soon becomes quite great in the furnace and then the desired double silicate begins to form.

It will also now be clear that upon starting the furnace the usual quantity of sodium carbonate or other compound suitable for producing a liquid slag must be added to the charge and that this said compound will be gradually omitted as the alkali metal chloride vapors begin to condense on the colder portions of the charge and return to the fusion zone. In practice, I prefer to use the sodium or potassium chloride in excess of theoretical requirements at all times, and in a great excess when starting the furnace in order to reach the desired concentration of alkali metal vapors in as short a time as possible.

What is claimed is:

1. The process of making glass in a blast furnace which consists in providing a charge of blast furnace slag mixed with an alkali metal chloride and carbonaceous material; igniting said charge; and continuing the melting of the same until an iron free glass consisting essentially of calcium-sodium silicate is produced.

2. The process of making glass which consists in providing a blast furnace with a charge consisting of a mixture of blast furnace slag and carbonaceous fuel; adding to the first portions of the charge a compound capable of producing a liquid slag; adding to the charge an alkali metal chloride; igniting the charge to produce a glass or slag; and continuing the production of said glass or slag until the desired quality of glass is had.

3. The process of making glass which consists in providing a blast furnace with a charge consisting of a mixture of blast furnace slag and carbonaceous fuel; adding to the first portions of the charge a sodium compound capable of producing a liquid slag; adding to the charge an alkali metal chloride in excess; igniting the charge to produce a glass or slag; and continuing the production of said glass or slag until the concentration of the resulting alkali metal vapors reach a predetermined value and the desired quality of glass is had.

In testimony whereof I affix my signature.

CHARLES E. PARSONS.